US009428227B2

(12) United States Patent
Jones et al.

(10) Patent No.: US 9,428,227 B2
(45) Date of Patent: Aug. 30, 2016

(54) VEHICLE BODYWORK

(71) Applicant: Gordon Murray Design Limited, Shalford (GB)

(72) Inventors: Mark Andrew Jones, Shoreham-by-Sea (GB); Barry Lett, Chobham (GB)

(73) Assignee: GORDON MURRAY DESIGN LIMITED, Shalford (GB)

( * ) Notice: Subject to any disclaimer, the term of this patent is extended or adjusted under 35 U.S.C. 154(b) by 0 days.

(21) Appl. No.: 14/413,964

(22) PCT Filed: Jul. 5, 2013

(86) PCT No.: PCT/EP2013/064250
§ 371 (c)(1),
(2) Date: Jan. 9, 2015

(87) PCT Pub. No.: WO2014/009271
PCT Pub. Date: Jan. 16, 2014

(65) Prior Publication Data
US 2015/0175220 A1  Jun. 25, 2015

(30) Foreign Application Priority Data

Jul. 10, 2012  (GB) .................................. 1212206.5

(51) Int. Cl.
*B62D 25/02*  (2006.01)
*B62D 29/04*  (2006.01)
(Continued)

(52) U.S. Cl.
CPC ............ *B62D 29/046* (2013.01); *B62D 23/00* (2013.01); *B62D 23/005* (2013.01); *B62D 25/02* (2013.01);
(Continued)

(58) Field of Classification Search
CPC .. B62D 29/046; B62D 23/00; B62D 23/005; B62D 25/02; B62D 27/026; B62D 29/043; B62D 65/16; Y10T 29/49826; Y10T 29/49895
See application file for complete search history.

(56) References Cited

U.S. PATENT DOCUMENTS

| 4,045,075 A | 8/1977 | Pulver |
| 5,271,687 A | 12/1993 | Holka et al. |

(Continued)

FOREIGN PATENT DOCUMENTS

| EP | 1382517 A2 | 1/2004 |
| EP | 2865582 A1 | 4/2015 |

(Continued)

OTHER PUBLICATIONS

Great Britain Search Report, Nov. 4, 2012, relating to application GB1212206.5.

(Continued)

*Primary Examiner* — Lori L Lyjak
(74) *Attorney, Agent, or Firm* — Westerman, Champlin & Koehler, P.A.; Z. Peter Sawicki; Amanda Prose

(57) ABSTRACT

A laser-cut and spot-welded tubular frame chassis typically has an accuracy of ±1.5 mm. To allow positioning of exterior body panels to an accuracy of ±0.2 mm we propose that the vehicle comprise one or more integration panels, lying between the tubular framework and the exterior body panels. These can be made of a lightweight material, and can be made to be structural or non-structural depending on the intended use and location of the panel. It can also be attached adhesively to the framework at an early stage of manufacture. A jig with a suitable datum point can hold the integration panels while the adhesive sets, or a robotic arm or the like can hold the panel in the correct position. An adhesive thickness of about 3 mm will allow chassis tolerances of ±1.5 mm in any direction to be accommodated. The exterior body panels can then be attached to the integration panels in any preferred manner, such as adhesives, bolts, clips or the like. This attachment is preferably non-adhesive, and can therefore be done at a late stage in manufacture after much of the interior work has been done. The integration panel will also provide a convenient point for providing fittings and fixings for ancillaries within the vehicle such as brake lines, wiring, NVH panels and the like. A molded integration panel can be formed with appropriate fitting and fixings as necessary. This will also reduce the number of brackets and the like which need to be welded to the framework, reducing the energy cost of the vehicle manufacturing process.

14 Claims, 2 Drawing Sheets

(51) Int. Cl.
   *B62D 23/00* (2006.01)
   *B62D 27/02* (2006.01)
   *B62D 65/16* (2006.01)

(52) U.S. Cl.
   CPC .......... *B62D 27/026* (2013.01); *B62D 29/043* (2013.01); *B62D 65/16* (2013.01); *Y10T 29/49826* (2015.01); *Y10T 29/49895* (2015.01)

(56) References Cited

U.S. PATENT DOCUMENTS

| | | |
|---|---|---|
| 5,800,003 A | 9/1998 | Clenet |
| 6,135,542 A | 10/2000 | Emmelmann et al. |
| 2005/0214096 A1 | 9/2005 | Zaluzec et al. |
| 2011/0298243 A1 | 12/2011 | Auer |

FOREIGN PATENT DOCUMENTS

| | | |
|---|---|---|
| JP | H1045027 A | 2/1998 |
| WO | 0181155 A2 | 11/2001 |
| WO | 2009/122178 A1 | 4/2008 |

OTHER PUBLICATIONS

International Search Report and Written Opinion, Oct. 10, 2013, relating to application PCT/EP2013/064250.

Office Action issued for corresponding patent application No. GB1212206.5, dated Dec. 3, 2015.

VEHICLE BODYWORK

CROSS-REFERENCE TO RELATED APPLICATION

This application is a Section 371 National Stage Application of International Application No. PCT/EP2013/064250, filed Jul. 7, 2013 and published as WO2014/009271 on Jan. 16, 2014, in English, which claims priority to GB Application No. 1212206.5, filed Jul. 10, 2012, the contents of which are hereby incorporated by reference in their entirety.

FIELD OF THE INVENTION

The present invention relates to vehicle body panels, and the manner in which they can be fitted to a chassis.

BACKGROUND ART

Modern volume-produced vehicles almost all use a chassis formed of pressed steel. The chassis is formed by a pressing/stamping operation involving one or more steps and spot welding numerous panels to crate the complete body. This produces a steel chassis which has the rigidity necessary for maintaining the dynamic qualities of the vehicle but which is heavy and requires very substantial tooling for its production. The remaining necessary parts of the vehicle structure are then spot-welded or MIG welded to the assembly. Additional exterior body panels and closures can be fixed to the chassis, by bolts, clips or other forms of fixings.

The tools required to form the chassis are physically large, and must therefore be housed in a large facility. A substantial material cost (with attendant environmental footprint) is therefore involved in the chassis, the tools and the facility, the weight of the resulting chassis imposes a substantial ongoing environmental footprint as a result of the consequential energy requirements of the vehicle, and the large facility imposes a corresponding ongoing environmental footprint in terms of its heating, its lighting, its maintenance and so on. The necessary spot-welding involves significant energy consumption. Our earlier application WO2009/122178 therefore set out a novel form of chassis which comprises a tubular metallic framework reinforced with load-bearing composite panels that act to distribute forces across the framework.

SUMMARY OF THE INVENTION

Modern laser cutting and spot-welding processes are capable of building the tubular steel frame of such a chassis to an accuracy of approximately 1.5 mm, which is sufficient to ensure the structural rigidity and soundness of the frame. However, this is not sufficient to allow the placement of body panels affixed to the chassis with the necessary positional accuracy. Typically, leading automotive manufacturers aim to locate exterior body panels to an accuracy of ±0.2 mm so as to maintain the highest standard of fit and finish to the vehicle that is the end result. Any deterioration from this level of accuracy will manifest itself in the panel gaps and panel accuracy of the vehicle and will be noticed by discerning customers.

We therefore propose that the vehicle comprise one or more integration panels, lying between the tubular framework and the exterior body panels. These can be made of a lightweight material as they are not intended to be loadbearing, and can be attached adhesively to the framework at an early stage of manufacture. The use of a jig with a suitable datum point to hold the integration panels while the adhesive sets will allow the integration panels to be located precisely regardless of minor tolerances in the tubular framework. Alternatively, a robotic arm or the like can hold the panel in the correct position while the adhesive sets. An adhesive thickness of about 3 mm will allow chassis tolerances of ±1.5 mm in any direction to be accommodated.

The exterior body panels can then be attached to the integration panels in any preferred manner, such as adhesives, bolts, clips or the like. This attachment is preferably non-adhesive, and can therefore be done at a late stage in manufacture after much of the interior work has been done.

The integration panel will also provide a convenient point for providing fittings and fixings for ancillaries within the vehicle such as brake lines, wiring, NVH panels and the like. A moulded integration panel can be formed with appropriate fitting and fixings as necessary. This will also reduce the number of brackets and the like which need to be welded to the framework, reducing the energy cost of the vehicle manufacturing process.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
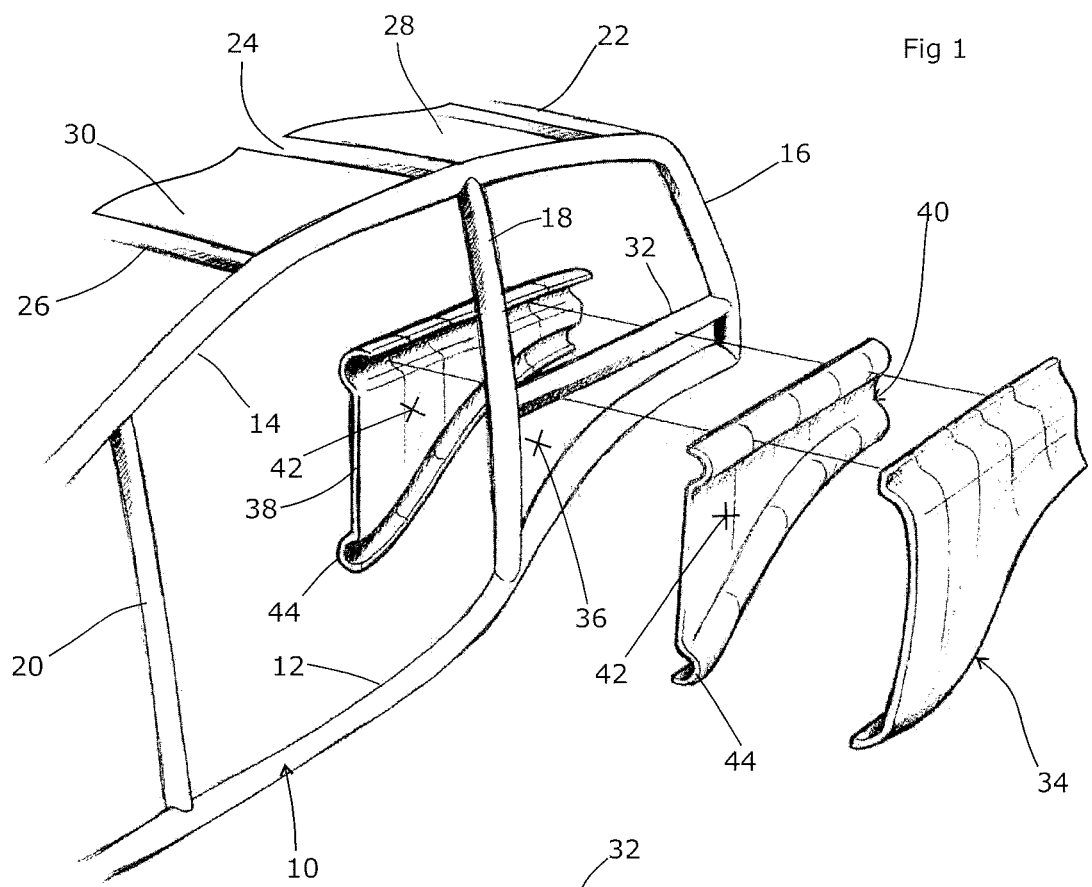
FIG. 1 shows a chassis with integration panels and a bodywork panel about to be fitted.
Figure 2:
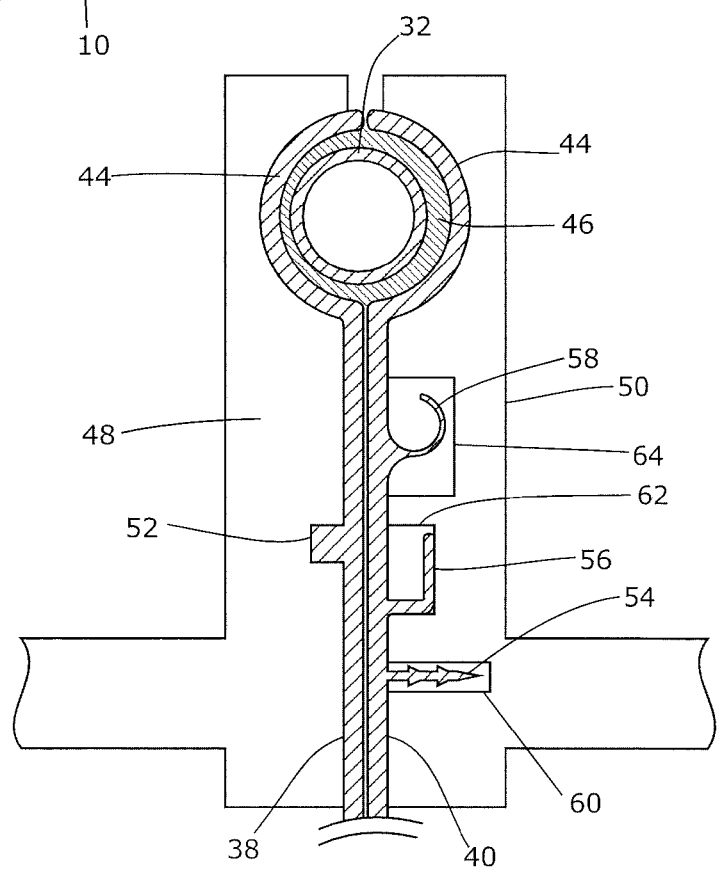
FIG. 2 shows a cross-section through a bodywork section during the assembly process.
Figure 3:
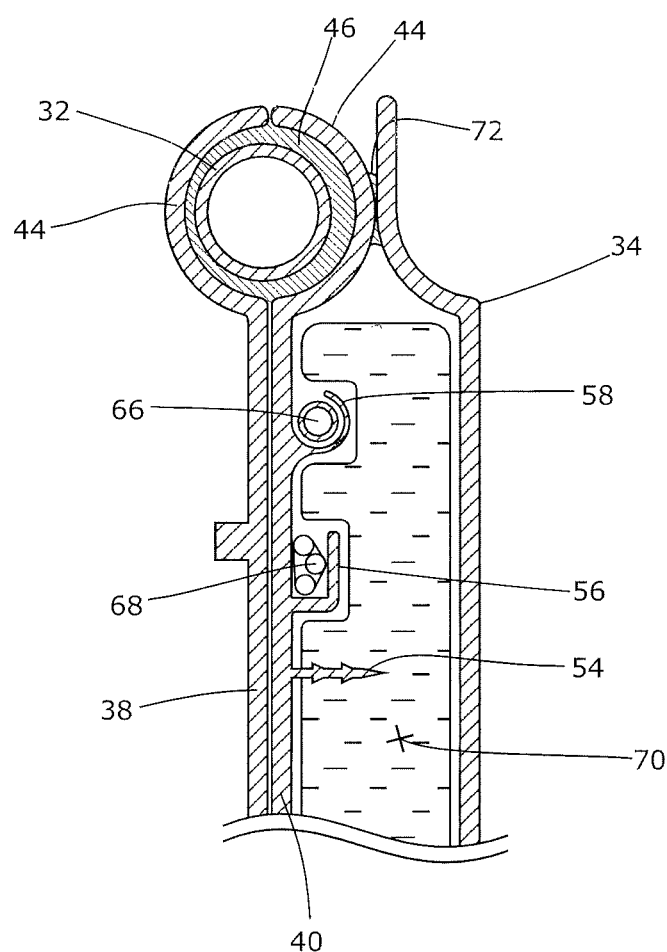
FIG. 3 shows a cross-section through a complete bodywork section.

FIGS. 1, 2 and 3 illustrate the process of building a vehicle according to the present invention, and the resulting vehicle. A tubular-frame chassis 10 comprises a number of longitudinal members 12, 14 spaced by vertical spans 16, 18, 20. Lateral members 22, 24, 26 extend across the width of the vehicle to the corresponding longitudinal members (not shown) on the opposing side. In our preferred form of chassis, load-bearing composite panels 28, 30 are attached to the tubular members and provide bracing to the structure thereby lending it the necessary structural rigidity. In this example, panel 28 is attached to the longitudinal member 14 (and its counterpart on the opposing side) together with the lateral members 22, 24. Meanwhile, panel 30 is attached to the longitudinal member 14 (and its counterpart on the opposing side) together with the lateral members 24, 26. However, the panels could be attached to any combination of members, may preferably be non-planar, and may also be attached to multiple members not defining a single geometric plane.

The chassis also includes a longitudinal spar 32 extending between the vertical spans 16, 18. It is the wish of the vehicle designer, in this case, to attach an exterior body panel 34 covering the region 36 bounded by the lower longitudinal member 12, the vertical span 18, the longitudinal spar 32, and the rearmost vertical span 16. This however faces the difficulty that the chassis members are located to an accuracy of ±1.5 mm whereas to provide correct fit & finish quality the exterior body panel must be positioned to an accuracy of ±0.2 mm. To do so using non-metallic body panels that cannot be welded to the chassis will require a lengthy and difficult process relying on precision-adjustable fasteners. This results in a slow and expensive build process.

We therefore propose that an integration panel be attached to the chassis prior to the exterior body panel. This can be attached at an early stage of construction and, if desired, the remainder of the build can be completed or substantially completed prior to attaching the exterior body panels to the integration panels. This will mean that the integration panels can be attached adhesively to the chassis which will allow them to take up dimensional tolerances in the chassis via the glue layer, and the exterior body panels can be attached via fixings or the like, i.e. non-adhesively, thus avoiding potentially messy processes at the later stages of production which could spoil the exterior finish of the vehicle.

The panel can be made of a lightweight material, and can be made to be structural or non-structural depending on the intended use and location of the panel.

FIG. 1 shows such a process. An inner integration panel 38 and an outer integration panel 40 are fitted either side of the region 36. These are each moulded from a suitable lightweight plastics material and have a generally planar central section 42 and a half-curved edge 44 shaped to fit around one side of the relevant chassis bar 12.

A relatively thick layer of adhesive 46 is applied to the inner faces of the half-curves 44 of each integration panel 38, 40 and the panels are either placed in a jig or held by a robotic servo-controlled arm (or the like) so that they can be placed over the chassis at a predetermined point relative to a fixed datum on the chassis such as a central point of the lower floor. This stage is shown in FIG. 2. Such jigs are well-known, are attachable to a datum point on the chassis, and extend therefrom to provide a jaw 48, 50 which has formations that fit around the panel (or other item) 38, 40 in question. In this case, the inner panel 38 has a datum projection 52 which fits into a corresponding recess on the jaw 48 so as to locate the panel 38 precisely. The outer panel 40 has no such projection (in this case) but has a number of formations 54, 56, 58 which will be described below and for which corresponding shaped recesses 60, 62, 64 are provided in the jaw 50. Some of the recesses 60, 64 are oversize and merely accommodate the relevant formation 54, 58 without damaging it, whereas the other recess 62 is shaped to abut against the relevant formation 56 and thereby locate the panel accurately. A datum projection 52 could be provided in addition or instead, however.

Once the integration panels 38, 40 are held in position by the jaws 48, 50, whether these are located by a jig or a robotic arm, the adhesive can be left to dry. The jigs or arms can be left in place during this process, or (more preferably) they can be left in place during an initial part of the setting process and then replaced with a temporary clamp after the adhesive has partly set. During this period, the weight of the panels will largely be taken up by the part-set adhesive and all that is required is to prevent the panel from sagging. Removing the jig or jigs (or robotic arms) will however allow the vehicle to progress through the manufacturing process and release the jigs (etc) for use on a further vehicle.

FIG. 3 then shows the complete panel. To reach this stage, the vehicle continued through production after the adhesive layer 46 had cured, with the other parts of the vehicle such as the engine, transmission, running gear, ancillaries and interior being fitted. The formations 54, 56, 58 assist in this process; formation 58 is sized and located so as to accept a brake line 66 running (in this case) from the brake master cylinder to the rear left brake calliper. Likewise, formation 56 is sized and located so as to accept a part of the wiring harness 68 running to the rear left light cluster. Formation 54 is in the form of a barbed spike onto which an insulating panel 70 can be pushed. This panel 70 consists mainly of a sound-deadening material which fills the region between the outer integration panel 40 and the exterior body panel 34.

It should be noted that the chassis bar 32 is not central within the two half-curved edges 44 of the integration panels 38, 40. Instead, the bar is slightly off-centre indicating a tolerance in its position which has been corrected by the integration panels. The integration panels 38, 40 were held by the jig (etc) relative to the datum and are therefore in the correct position allowing the exterior body panel 34 to be fitted to them with confidence. The adhesive layer 46 is thus thinner in some areas and thicker in others, accommodating the positional tolerance of the chassis bar 32.

At a late stage in construction, the exterior body panels 34 can be fitted. It is convenient to do so after all internal ancillaries have been fitted and all messy or potentially damaging processes have been completed, which the present invention enables. The exterior body panel 34 can thus be attached to the outer integration panel 40 via an adhesive 72 or a suitable fixing such as is known in the automotive industry.

It will of course be understood that many variations may be made to the above-described embodiment without departing from the scope of the present invention.

The invention claimed is:

1. A vehicle comprising:
 a chassis including a tubular framework,
 at least one intermediate panel, adhesively attached to the tubular framework,
 at least one exterior body panel, attached to the intermediate panel and at least partially concealing the intermediate panel.

2. The vehicle according to claim 1 in which the exterior body panel is attached to the intermediate panel non-adhesively.

3. The vehicle according to claim 2 in which the exterior body panel is attached to the intermediate panel via a bolt or clip.

4. The vehicle according to claim 1 wherein the glue layer between the tubular framework and the intermediate panel has at least one region that is at least 3 mm thick.

5. The vehicle according to claim 1 wherein the intermediate panel includes at least one fixing for a vehicle ancillary.

6. The vehicle according to claim 1 including at least one of a fluid conduit and an electrical cable located between the intermediate panel and the exterior body panel and supported by a fixing provided on the intermediate panel.

7. The vehicle according to claim 1 including an insulating material located between the intermediate panel and the exterior body panel and supported by a fixing provided on the intermediate panel.

8. The vehicle according to claim 1 including a loadbearing composite panel attached to the framework.

9. A method of constructing a vehicle, including the steps of:
 providing a chassis comprising a tubular framework,
 attaching a jig to a datum point on the chassis,
 fitting an integration panel to the jig,
 applying an adhesive to the integration panel,
 allowing the adhesive to set,
 removing the jig from the datum point
 wherein the jig is so shaped as to locate the integration panel adjacent to the chassis such the once set, the adhesive secures the integration panel to the chassis, and attaching an exterior body panel to the intermediate panel so as to at least partially conceal the intermediate panel.

10. A method of constructing a vehicle, including the steps of:
providing a chassis comprising a tubular framework,
locating the chassis at a datum point,
with a servo-controlled arm, lifting an integration panel into a pre-set position adjacent to the chassis,
applying an adhesive to the integration panel,
allowing the adhesive to set,
withdrawing the servo-controlled arm leaving the integration secured to the chassis, and
attaching an exterior body panel to the intermediate panel so as to at least partially conceal the intermediate panel.

11. The method of constructing a vehicle according to claim 10 in which the pre-set position of the integration panel is jigged.

12. The method of constructing a vehicle according to claim 9 in which the integration panel is located adjacent to but independent from the chassis.

13. The method of constructing a vehicle according to claim 10 in which the integration panel is located adjacent to but independent from the chassis.

14. The method of constructing a vehicle according to claim 11 in which the integration panel is located adjacent to but independent from the chassis.

* * * * *